Jan. 7, 1930.　　　　　G. GODDU　　　　1,742,500
MACHINE FOR INSERTING FASTENINGS
Original Filed July 3, 1924　　2 Sheets-Sheet 1

Jan. 7, 1930.  G. GODDU  1,742,500
MACHINE FOR INSERTING FASTENINGS
Original Filed July 3, 1924    2 Sheets-Sheet 2
Fig. 2.
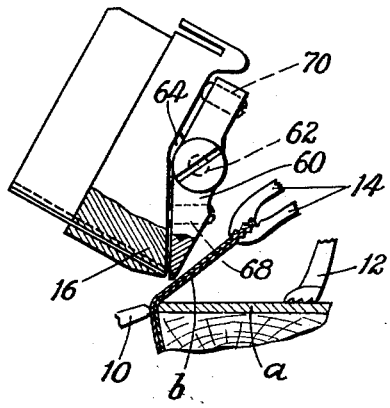
Fig. 3.
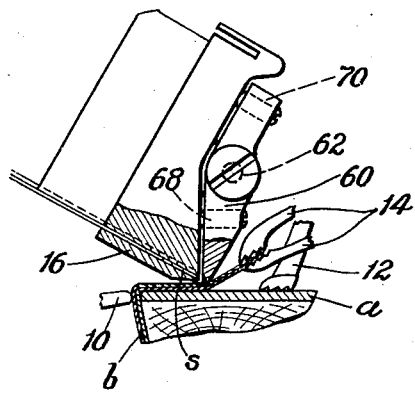
Fig. 4.
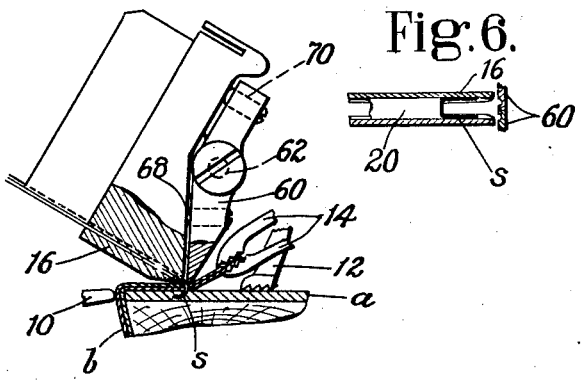
Fig. 6.
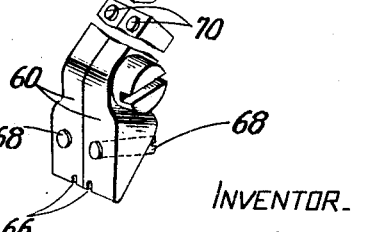
Fig. 5.
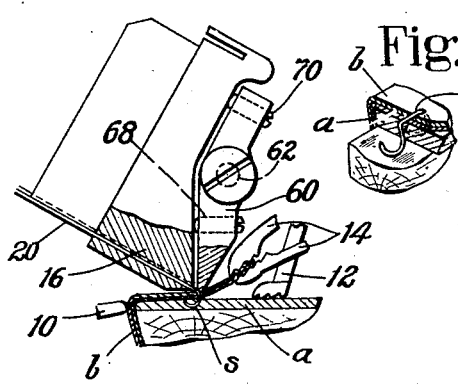
Fig. 7.
Fig. 8.
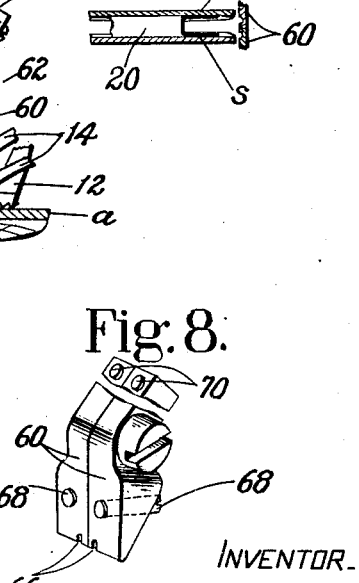
INVENTOR.
George Goddu
By his Attorney,
Nelson W. Howard Patented Jan. 7, 1930

1,742,500

UNITED STATES PATENT OFFICE

GEORGE GODDU, OF WINCHESTER, MASSACHUSETTS, ASSIGNOR TO UNITED SHOE MACHINERY COMPANY, OF PATERSON, NEW JERSEY, A CORPORATION OF NEW JERSEY

MACHINE FOR INSERTING FASTENINGS

Original application filed July 3, 1924, Serial No. 724,136. Divided and this application filed June 11, 1927.
Serial No. 198,179.

This invention relates to machines for inserting fastenings, and is herein illustrated as embodied in a machine having means for fastening the upper of a shoe to the insole in the lasting operation, this application being a division of a copending application Serial No. 724,136, filed on July 3, 1924. While the invention is thus disclosed in its application to shoe manufacture, and more particularly to the upper-fastening operation, it is considered that in its more general aspects it has a comparatively wide range of utility, and it is accordingly not to be regarded as limited to the illustrated use or embodiment.

In applying fastenings to some kinds of work it is inconvenient, impracticable or undesirable to anchor the fastenings by clinching them on any surface of the work. This is true, for example, where the surface of the work on the opposite side from the driving means is not conveniently accessible, where the work is thicker than the length of the fastenings, or where it is undesirable to have the fastenings penetrate, as they might, entirely through the work, as in fastening uppers to insoles in the manufacture of certain kinds of shoes. The present invention accordingly provides a novel organization of means for driving and for anchoring fastenings without clinching them on the work, the machine herein shown having a novel construction and arrangement of driving means and deflecting means whereby each fastening is curved progressively in the driving operation by engaging it at the same side of the work as the driving means to cause it to follow a curved path in the work. As herein illustrated the fastening is driven by a driver movable in a direction inclined to the surface of the work and is so deflected as to cause it to enter the work in a direction substantially or approximately perpendicular to said surface and then to curve reversely in the work in a general direction opposite to that of the movement of the driver and to such an extent that the end of the fastening returns toward that surface of the work at which it entered.

While the invention, in its more general aspects, is not limited with respect to the form of the fastenings, the invention is illustrated in its application to means for driving and anchoring staples, and for the purposes in view the deflecting means shown is so constructed and arranged as to deflect or curve the legs of the staple laterally of the cross-bar, i. e., in directions transverse to the plane determined by the legs and the cross-bar prior to the deflection, to anchor the staple in the work. The machine herein shown is so organized as to drive upper-fastening staples by movement of a driver in a direction inclined inwardly away from the edge of the shoe bottom and to deflect the legs outwardly toward the edge, although the invention is not limited to the driving of the fastenings in this particular relation to the shoe. In its application to shoe manufacture the invention thus provides means which may be utilized to drive and anchor upper-securing fastenings in such manner as not to penetrate through the insole, or in any event to insure that the points of the fastenings will not work up through the insole in the wear of the shoe, even if the insole is comparatively thin.

The novel features of the invention, including also means for varying the curvature imparted to fastenings in the driving operation, and various novel details of construction and combinations of parts, will now be more particularly described with reference to the accompanying drawings and thereafter pointed out in the claims.

In the drawings,

Figs. 2, 3, 4 and 5 are detail views on a larger scale showing parts of the machine as positioned at different stages in the operations on a shoe;

Fig. 6 is a sectional view through the staple-driving and deflecting means, showing the staple before it begins to enter the shoe;

Fig. 7 is a view on an enlarged scale of a portion of the shoe materials illustrating the shape of the staple after it has been driven and anchored; and Fig. 8 is a perspective view of the staple-deflecting means.

Figure 1:
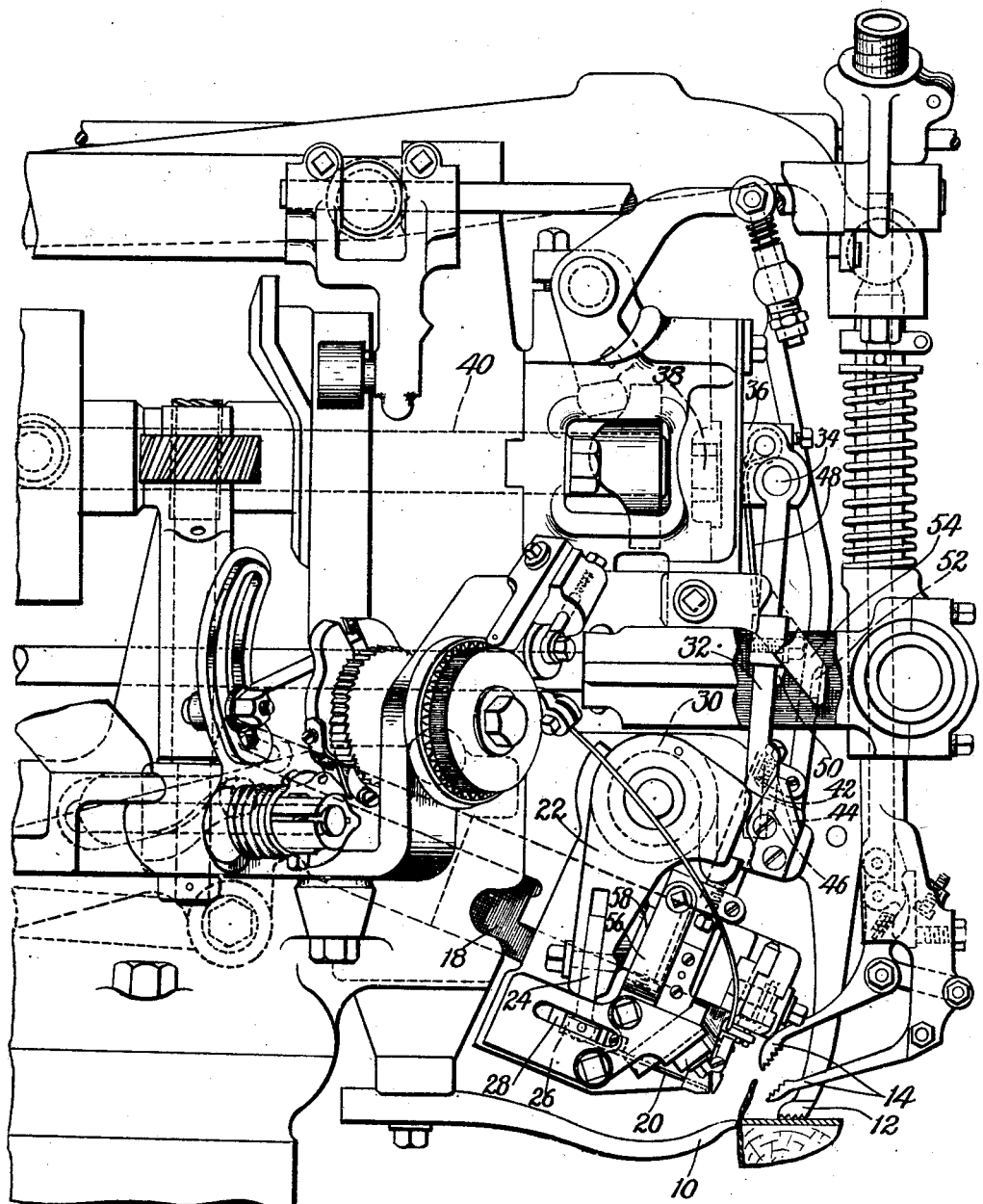
Fig. 1 is a view in side elevation of a portion of the head of a machine in which the invention is embodied.

As more fully shown and described in the copending application, the machine illustrated comprises an edge rest 10 for engaging the side of the shoe, a stationary bottom rest 12 for engaging the outer or bottom face of the insole, a gripper 14 for gripping and pulling the upper in each location where a lasting operation is to be performed, and means including a staple guide or nozzle 16 for laying the upper over the bottom of the insole in position to be fastened, the member 16 being carried by a slide 18 which is movable in a path inclined forwardly and downwardly toward the bottom of the shoe. The means for operating the gripper and the means for imparting operative movement to the slide 18 need not be described herein, since they are not of special interest in relation to the present invention and are, moreover, fully described in the copending application. As also fully shown and described in said application, the machine is provided with means (not herein shown in detail) for forming the staples and for transferring them into position to be driven from the nozzle 16.

The staple is driven by means of a driver 20 on the slide 18, which is movable through a staple-guiding passage formed in the nozzle member 16. For operating the driver 20 there is provided a bell-crank lever 22 which is pivotally mounted on an extension of the slide 18 and has clamped in a downwardly extending arm thereof a bar 24 one end of which is swiveled in a bearing formed in a block 26 mounted for upward and downward sliding movements in a driver bar 28 to which the driver 20 is secured. The lever 22 is operated to impart staple-driving movement to the driver 20 by a torsion spring 30. For swinging the lever 22 against the resistance of the spring 30 to retract the staple driver, there is provided means for depressing a forwardly extending arm of the lever, comprising a link 32 which is pivotally connected at 34 to a slide 36 operated by a crank 38 on a shaft 40. At its lower end the link 32 carries a plate 42 positioned at the rear of a plate 44 mounted on the front end of the forwardly extending arm of the lever 22, and the plate 42 is provided with a shoulder 46 which is arranged to engage the upper edge of the plate 44 to impart to the lever 22 its driver-retracting movement. A spring 48 tends to swing the link 32 forwardly and thus to hold the plate 42 against the plate 44. In order to cause the driver to drive the staple there is provided means for disengaging the shoulder 46 of the plate 42 from the upper edge of the plate 44, thereby releasing the lever 22 to the action of the spring 30. For this purpose the link 32 carries a cam member 50 which is arranged to engage a stationary cam member 52 on an arm 54 which is fast on the head of the machine. For limiting the movement of the lever 22 the slide 18 has thereon a projection 56 provided with an adjustable fiber disk 58 in position to be engaged by a boss on the lever.

By reference to Fig. 6 it will be seen that the staple $s$, as formed and transferred into a position in alignment with the driver 20, is provided with straight legs; and for anchoring the staple in the work there is provided means for bending the legs progressively as the staple is driven, so that they follow curved paths in the work. For this purpose there is mounted on the staple-guiding nozzle 16, and therefore at the same side of the work as the driving means, a deflector comprising a pair of bending members 60 pivoted on a stud 62 which is carried by a bracket 64 (Fig. 2) on the member 16. The members 60 at their lower ends are notched or grooved at 66 (Fig. 8) to provide surfaces positioned in the line of drive of the staple legs for engaging the legs and deflecting them in a positively predetermined manner during the driving of the staple into the work, while guiding them in predetermined planes. The staple deflector is thus so positioned and shaped as to bend different portions of the legs of the staple successively, before the different respective portions enter the work, to the same positively determined degree, thus giving all portions of the legs of the staple that enter the work a substantially regular curvature determined independently of resistance of the work and causing them to follow predetermined curved paths in the work. In the construction shown the legs are curved in arcs of such radius that their ends return toward that surface of the work at which they entered. By bending the legs of the staple in this manner the deflecting means determine likewise the depth of penetration of the staple into the work.

In the construction shown each of the members 60 is adjustable independently of the other about its pivot 62, to vary the curvature of each leg of the staple independently, and set screws 68 and 70 threaded in the member 60 and bearing on the nozzle member 16 are provided for adjusting each member and for holding it firmly in adjusted position. It will be seen that by adjustment of either member 60 about its pivot its lower deflecting end may be positioned at different distances from the end of the staple-guiding nozzle 16 from which it is spaced, thereby determining with great precision the curvature of the staple legs. It will be further evident that, since the staple-guiding nozzle 16 positively guides the unbent portions of the legs of the staple in a plane transverse to the direction of the bending effected by the staple deflector until these portions emerge from the guideway in the nozzle, engaging the legs on the opposite side from the deflector in close relation to the latter as the bending operation progresses, the bending is confined at any one time to a comparatively small portion of the length of the staple legs, and this is an important factor in the accurate control of the degree of curvature imparted to the legs.

The invention is illustrated in its application to means for lasting a shoe of the McKay-sewed type having an insole $a$ provided with a plane bottom face over which the margin of the upper materials $b$ are laid in the lasting operation. By reference to Figs. 2 and 3 it will be seen that the upper is pulled by the gripper 14 and is then laid inwardly over the insole by the forward and downward movement of the staple nozzle 16 and the deflector members 60. The staple is then driven and is anchored in the intact substance or body of the insole in the manner illustrated in Figs. 4 and 5 with its cross-bar substantially parallel to the edge of the insole. It will be seen that the staple, driven by movement of the driver 20 in a direction inclined to the plane of the insole, is deflected so that its legs enter the shoe materials in substantially perpendicular relation to the plane of the insole and then follow, from the points where they enter the shoe, curved paths each leading backwardly in a general direction opposite to that of the movement of the driver. As herein illustrated the legs of the staple are bent in arcs of such radius that without penetrating to the inner face of the insole their ends are directed reversely toward its bottom face, or toward that face of the work at which they entered. The ends of the staple legs thus driven may or may not emerge from the bottom face of the insole, since in any event they are covered by or embedded in the shoe bottom materials after the outsole has been applied. As herein illustrated also the staple is driven by movement of the driver in a direction inclined inwardly away from the edge of the shoe bottom and its legs are curved outwardly toward said edge, although the invention is not limited to means for driving the staple in that particular relation to a shoe.

It will be understood that a staple is driven and anchored in the manner above described in each location where a lasting operation is performed, and that the upper is fastened securely and permanently in lasted position by the staples. It will be seen that the staples are driven into the intact substance of the insole and that secure anchorage for the legs of the staple is thus afforded even though the insole may be comparatively thin. By reason of the accurate predetermination of the curvature of the staple legs independently of resistance of the shoe materials, a comparatively thin and flexible insole may be utilized without penetration of the staples entirely through it.

In the claims the term "sole" is generally used for convenience to refer to that part of a shoe to which the upper is fastened in lasting, whether it be an insole of a shoe of the McKay-sewed type or of other types or that part which in certain kinds of shoes may be the outsole or the only sole with which the shoe is provided; and furthermore the expression "bottom of the sole" is used with reference to that face of the sole which is outermost at the time of the lasting of the shoe regardless of its position in the completed shoe.

The novel method of driving and anchoring fastenings herein disclosed is claimed in a copending application Serial No. 291,881 filed on July 11, 1928.

Having described the invention, what I claim as new and desire to secure by Letters Patent of the United States is:—

1. In a machine of the class described, the combination with shoe-positioning means, of means for fastening the upper of a shoe to the sole, said fastening means comprising mechanism for driving a fastening through the upper and into the bottom of the sole and for directing the fastening in a predetermined path curved from the point where it enters the sole in such degree as to cause the end of the fastening to return toward the bottom face of the sole without penetrating its inner face.

2. In a machine of the class described, the combination with shoe-positioning means, of means for fastening the upper of a shoe to the sole, said fastening means comprising mechanism for driving a fastening through the upper and into the sole, and a deflector at the same side of the work as the driving mechanism for imparting to different straight portions of the fastening successively in the driving operation a substantially regular curvature determined independently of the resistance of the shoe materials.

3. In a machine of the class described, the combination with shoe-positioning means, of means for fastening the upper of a shoe to the sole, said fastening means comprising a driver movable in a direction inclined to the plane of the sole, and a deflector arranged to bend the fastening as it is driven to cause it to enter the shoe in a direction at an angle to the direction of movement of the driver and to curve thence in a path such as to anchor it in the sole.

4. In a machine of the class described, the combination with shoe-positioning means, of means for fastening the upper of a shoe to the bottom face of the sole, said fastening means comprising a driver movable in a direction inclined to the plane of the sole toward its bottom face, and means for engaging the fastening in the driving operation at the same side of the work as the driver to deflect it in a curved path leading back toward the bottom face of the sole in a direction substantially opposite to that of the movement of the driver.

5. In a machine of the class described, the combination with a shoe-positioning means, of means for fastening the upper of a shoe to the sole, said fastening means comprising mechanism for driving a fastening through the upper and into the sole, and a device for engaging the fastening at the same side of the work as the driving mechanism to deflect it in a curved path such as to cause it to return in the sole toward that surface of the work at which it entered.

6. In a machine of the class described, the combination with shoe-positioning means, of means for fastening the upper of a shoe to the sole, said fastening means comprising mechanism for driving a fastening through the upper and into the bottom of the sole, and a device arranged to deflect the fastening in a curved path throughout substantially its whole length to cause the end of the fastening to return in the sole toward the bottom face of the latter.

7. In a machine of the class described, the combination with shoe-positioning means, of means for fastening the upper of a shoe to the sole, said fastening means comprising mechanism movable in a direction inclined inwardly away from the edge of the sole to drive a fastening through the upper and into the bottom of the sole, and a device arranged to act on different portions of the fastening in the driving operation, before the different respective portions enter the shoe, to deflect them outwardly toward the edge of the sole in a curved path.

8. In a machine of the class described, the combination with shoe-positioning means, of means for fastening the upper of a shoe to the sole, said fastening means comprising mechanism movable in a direction inclined inwardly away from the edge of the sole to drive a fastening through the upper and into the bottom of the sole, and means for engaging the fastening in the driving operation at the same side of the work as the driving mechanism to deflect it outwardly toward the edge of the sole in a curved path leading back toward the bottom face of the sole.

9. In a machine of the class described, the combination with shoe-positioning means, of means for fastening the upper of a shoe to the sole, said fastening means comprising a driver movable in a direction inclined to the plane of the sole to drive a fastening through the upper and into the bottom of the sole, and a deflector arranged to bend the fastening as it is driven to cause it to enter the shoe in substantially perpendicular relation to the plane of the sole and to curve thence in a path of such radius as not to penetrate the inner face of the sole.

10. In a machine of the class described, the combination with shoe-positioning means, of means for fastening the upper of a shoe to the sole, said fastening means comprising mechanism for driving a staple through the upper and into the sole and a device arranged to act on the legs of the staple as they are being driven to bend different portions of them successively, before the different respective portions enter the sole, laterally of the cross-bar of the staple.

11. In a machine of the class described, the combination with shoe-positioning means, of means for fastening the upper of a shoe to the sole, said fastening means comprising a driver for driving a staple through the upper and into the bottom of the sole, and a device arranged to act on the legs of the staple in the driving operation to cause them to enter the shoe in directions at an angle to the direction of movement of the driver and then to follow curved paths leading back toward the bottom face of the sole.

12. In a machine of the class described, the combination with shoe-positioning means, of means for fastening the upper of a shoe to the sole, said fastening means comprising mechanism for driving a staple through the upper and into the bottom of the sole with the cross-bar of the staple substantially parallel to the edge of the sole, and a device arranged to act on the legs of the staple as they are driven to deflect them substantially throughout their length laterally of the cross-bar of the staple in curved paths leading outwardly toward the edge of the sole and of such radius as to direct the ends of the staple legs reversely toward the bottom face of the sole.

13. In a machine of the class described, the combination with shoe-positioning means, of means for fastening the upper of a shoe to the sole, said fastening means comprising a driver movable in a direction inclined inwardly away from the edge of the sole to drive a staple through the upper and into the sole, and a device arranged to act on different portions of the staple legs successively, before the different respective portions enter the shoe, to deflect them outwardly toward the edge of the sole in paths of such curvature as not to penetrate the inner face of the sole.

14. In a machine of the class described, the combination with shoe-positioning means, of means for fastening the upper of a shoe to the sole, said fastening means comprising mechanism for driving a staple through the upper and into the bottom of the sole, and a device arranged to engage the legs of the staple at the same side of the work as the driving mechanism to deflect said legs laterally of the cross-bar of the staple in curved paths of such radius as to cause the ends of the staple legs to return toward the bottom face of the sole.

15. A machine of the class described having, in combination, means for driving a fastening, and means for imparting to different straight portions of the fastening successively during the driving of the fastening into the work, before the different respective portions enter the work, a predetermined degree of curvature such as to anchor the fastening in the work.

16. A machine of the class described having, in combination, means for driving a fastening, a guide for the fastening co-operating with said driving means, and a deflector positioned at the outlet end of said guide and spaced therefrom at the same side of the work as the driving means for engaging the fastening before it enters the work and for bending it progressively to cause it to follow a curved path in the work.

17. A machine of the class described having, in combination, means for driving a fastening, a deflector at the same side of the work as the driving means for engaging the fastening before it enters the work and for bending it progressively as it is driven, and a guide for the fastening so constructed and arranged in relation to said deflector as to confine the bending at any one time to a comparatively small portion of the length of the fastening.

18. A machine of the class described having, in combination, means for driving a fastening, a deflector arranged to act on different portions of the fastening successively before they enter the work to bend the fastening progressively as it is driven, and a guide arranged to engage the fastening in substantially close relation to the deflector on the opposite side of the fastening from the deflector to confine the bending at any one time to a comparatively small portion of the length of the fastening.

19. A machine of the class described having, in combination, means for driving a fastening, and means automatically operative in the driving operation to bend different portions of the fastening successively before the different respective portions enter the work, said bending means being constructed to impart to the fastening a predetermined degree of curvature such as to cause the end of the fastening to return in the work toward that surface of the work at which it entered.

20. A machine of the class described having, in combination, means for driving a fastening movable in a path inclined to that surface of the work into which the fastening is driven, and a deflector constructed and arranged to engage the fastening adjacent to the work and to bend it so that it enters the work in substantially perpendicular relation to said surface and then follows a curved path in the work to anchor it.

21. A machine of the class described having, in combination, a driver for driving a fastening movable in a path inclined to that surface of the work into which the fastening is driven, and means for engaging the fastening in the driving operation at the same side of the work as the driver to cause it to enter the work in a direction at an angle to that of the movement of the driver and then to follow a curved path leading back in a direction substantially opposite to that of said driver movement.

22. A machine of the class described having, in combination, means for driving a fastening, means for imparting to different portions of the fastening successively in the driving operation, before the different respective portions enter the work, a predetermined degree of curvature to anchor the fastening in the work, and means for varying said curvature.

23. A machine of the class described having, in combination, means for driving a fastening, a guide for the fastening co-operating with said driving means, and a deflector at the outlet end of said guide for engaging the fastening before it enters the work and for bending it progressively in the driving operation to cause it to follow a curved path in the work, said guide and deflector being relatively adjustable to vary the degree of curvature of the fastening.

24. A machine of the class described having, in combination, means for driving a fastening, and means for imparting to different portions of the fastening successively before they enter the work a predetermined curvature to cause the fastening to follow a curved path in the work, said last-named means being adjustable to vary the degree of said curvature and thereby to determine the depth of penetration of the fastening into the work.

25. A machine of the class described having, in combination, means for driving a staple, a guide for the staple, and a deflector positioned at the outlet end of said guide and spaced therefrom for engaging the legs of the staple before they enter the work and for bending them progressively as they are driven.

26. A machine of the class described having, in combination, means for driving a staple, a deflector for engaging the legs of the staple before they enter the work and for bending them progressively as they are driven, and a guide for the staple so constructed and arranged in relation to said deflector as to confine the bending at any one time to a comparatively small portion of the length of the staple legs.

27. A machine of the class described having, in combination, means for driving a staple, and a device automatically operative in the driving of the staple to bend different portions of its legs successively, before the different respective portions enter the work, laterally of the cross-bar of the staple.

28. A machine of the class described having, in combination, means for driving a staple, and a deflector in the line of drive for engaging the legs of the staple at the same side of the work as the driving means and for bending said legs in planes extending laterally of the cross-bar of the staple, said deflector having grooves to guide the legs in said planes.

29. A machine of the class described having, in combination, means for driving a staple, and a device for engaging the legs of the staple at the same side of the work as the driving means and for bending them progressively as they are driven, said device being constructed to impart to the staple legs a predetermined degree of curvature such as to cause them to return in the work toward that surface of the work at which they entered.

30. A machine of the class described having, in combination, means for driving a staple, and a device arranged to engage the legs of the staple at the same side of the work as the driving means to curve them in the driving operation laterally of the crossbar of the staple to such a degree as to cause their ends to return in the work toward that surface of the work at which they entered.

31. A machine of the class described having, in combination, means for driving a staple, and a deflector for engaging the legs of the staple at the same side of the work as the driving means and for bending said legs progressively to cause them to follow curved paths in the work, said deflector being adjustable to vary the curvature of the staple legs.

32. A machine of the class described having, in combination, means for driving a staple, and a device positioned in the line of drive for engaging the legs of the staple and bending different portions of said legs successively before the different respective portions enter the work, said device comprising separate bending members adjustable to vary the curvature of each of the staple legs independently of the other.

33. A machine of the class described having, in combination, means for driving a staple movable in a direction inclined to that surface of the work into which the staple is driven, and means for engaging the staple legs as they are being driven and for bending them to cause them to enter the work in substantially perpendicular relation to said surface and then to follow curved paths in the work to anchor them therein.

34. A machine of the class described having, in combination, means for driving a staple having straight legs, and means automatically operative as the legs of the staple are being forced into the work to bend different portions of said legs successively before the different respective portions enter the work.

35. A machine of the class described having, in combination, means for driving a staple movable in a direction inclined to that surface of the work into which the staple is driven, and a deflector for engaging the legs of the staple and for bending them progressively to cause them to enter the work in a direction at an angle to that of the movement of the driving means and then to follow curved paths in the work of such radius as to cause their ends to return toward that surface of the work at which they entered.

36. A machine of the class described having, in combination, means for driving a staple, and a device positioned in the line of drive at the same side of the work as the driving means for progressively bending the legs of the staple throughout substantially their whole length in planes extending laterally of the cross-bar of the staple to cause them to follow curved paths in the work.

In testimony whereof I have signed my name to this specification.

GEORGE GODDU.